Oct. 18, 1949.   W. W. PAGET   2,484,852
PRESSURE CONTROL DEVICE
Filed Nov. 23, 1944

Inventor:
Wm. W. Paget.
by Irwin A. Maxson,
Atty.

Patented Oct. 18, 1949

2,484,852

UNITED STATES PATENT OFFICE 2,484,852

PRESSURE CONTROL DEVICE

Win W. Paget, Michigan City, Ind., assignor to Joy Manufacturing Company, a corporation of Pennsylvania Application November 23, 1944, Serial No. 564,858

17 Claims. (Cl. 98—1.5)

My invention relates to pressure control devices, and more particularly to automatic pressure control devices especially designed for regulating pressure conditions in pressurized cabins of aircraft.

It is essential, for high altitude flight, that the cabins or other compartments intended for human occupancy in aircraft be pressurized. In what follows I shall use the term "cabin" as a generic term intended to include all such compartments. Cabin pressurization involves the provision of means for the introduction of air from the exterior of the cabin and means for the discharge of excess air from within the cabin. The cabin pressurizing device may be of various types, and must be capable of compressing the air from ambient pressure at any altitude at which the aircraft may fly to a pressure at least slightly above the pressure existent in the cabin at its altitude of flight. Since the specific structure of these air-supplying devices, provided they are capable of performing the function outlined, is immaterial to the present invention, which relates to means for controlling the discharge of excess air from within the cabin, it is unnecessary to deal further with the pressurizing instrumentality. Indeed, there may be no separate pressurizing device, but instead, if desired, the pressurizing air may be taken from the induction system of the aircraft propelling engine.

A desirable system of control for the aircraft cabin pressure involves permitting the cabin pressure to follow freely (to fall with during ascent and rise with during descent) the variations in external pressure when the aircraft is below a predetermined height, for example, 8000 feet. Above such a height, it is desirable that until a considerably greater height, say 35,000 feet, is reached, the pressure in the cabin be maintained relatively constant at approximately the pressure which corresponds to ambient pressure at 8,000 feet, or whatever other value is selected. If the aircraft has occasion to go above the upper limit mentioned, it is desirable that there shall be effected such a reduction in cabin pressure that the latter will again fall as the aircraft continues to rise, so that some predetermined relation between cabin pressure and ambient pressure may not be exceeded. For relatvely simple installations, it will suffice if there be provided a control which will prevent the ratio between cabin pressure and ambient pressure exceeding a given value.

An object of the present invention is to provide an improved automatic pressure control device. It is another object of my invention to provide an improved automatic pressure control device partially under pilot valve control and partially under the direct control of differential pressure areas, for providing the desired variations in cabin pressure. It is a further object of my invention to provide an improved automatic pressure control device especially adapted for the control of cabin pressure in aircraft. Still a further object of the invention is to provide an improved automatic pressure control device automatically operative to maintain at least substantially uniform pressure conditions under certain external pressures and a changing set of pressure conditions under other external pressures. Still another object of the invention is to provide an improved automatic pressure control device automatically operative to maintain substantially uniform cabin pressure conditions during flight at certain altitudes and cabin pressure conditions varying as altitude varies, above a predetermined higher altitude. Still another object is to provide an improved automatic pressure control device operative to permit cabin pressures to vary substantially directly with external pressures up to a predetermined altitude, and then during certain further increases in altitude to maintain cabin pressure substantially constant and, when a still higher altitude is reached, to provide for the maintenance of a cabin pressure which shall bear a relatively constant ratio to the external pressure as ascent continues. It is still another object of my invention to provide an improved cabin vent valve mechanism having incorporated therein a safety valve feature forming a direct part of the cabin vent valve means itself. Other objects and advantages of the invention will appear from the following description and from the appended claims.

In the accompanying drawings, in which I have shown one embodiment which my invention may assume in practice—

Figures 1, 2:
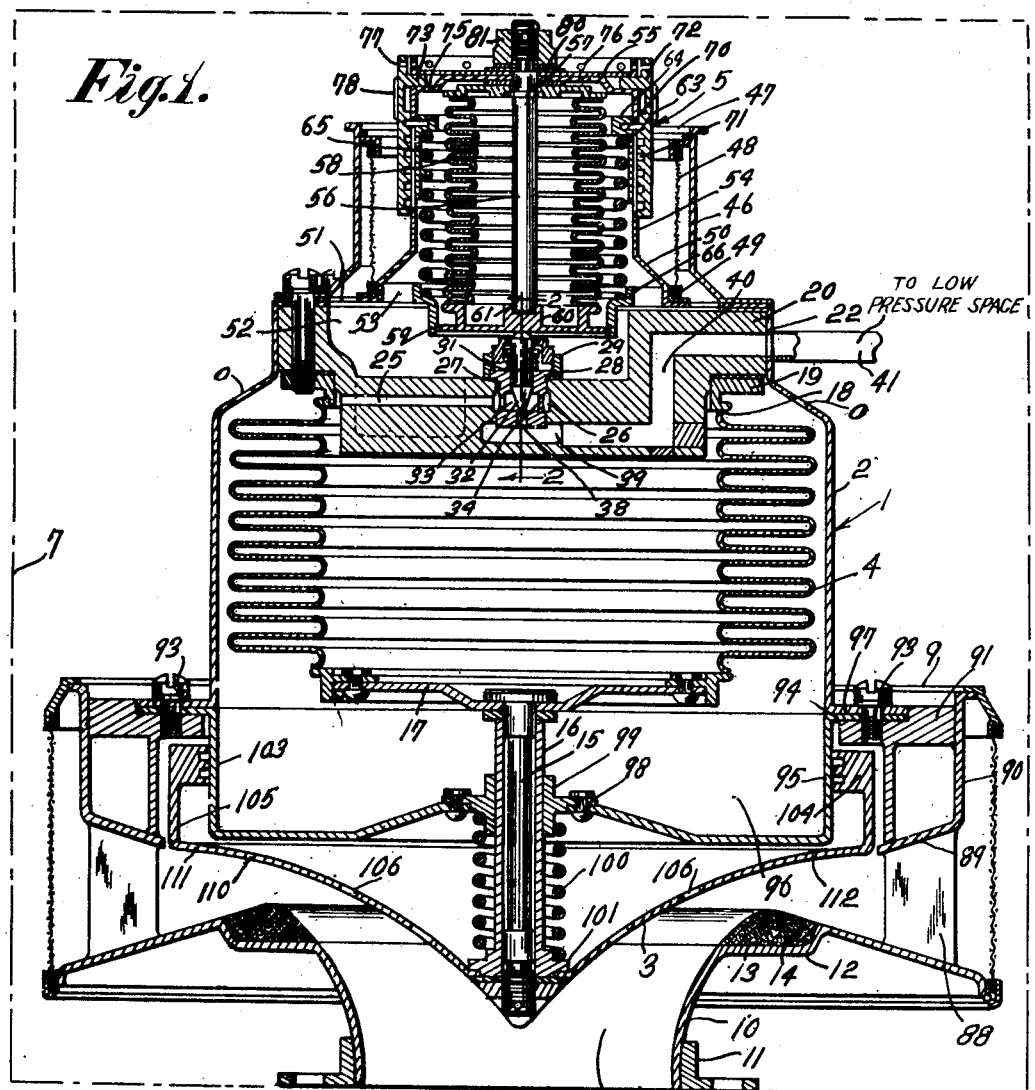
Fig. 1 is a central vertical sectional view through a valve mechanism embodying the invention in its illustrative form.
Fig. 2 is a detail sectional view on an enlarged scale, taken on the plane of the line 2—2 of Fig. 1.

It may be noted, referring to the drawings, that the cabin pressure control device is as a whole designated 1; and that it comprises a casing 2, perforated as at 0 to permit the access of cabin pressure to its interior, a vent valve 3, an expansible chamber control device or servo-motor 4, herein shown as a bellows, and a pilot control device 5 adapted to commence to function when the plane reaches an altitude above which a free drop in the cabin pressure may not desirably be continued. As will later be made apparent, the construction of the vent valve 3 provides an automatic control for cabin pressures after a relatively high altitude is attained, and operates to maintain a constant ratio between the pressure within the cabin and the external pressure above such altitude.

The casing 2 is mounted over an opening 6 in a wall of a cabin, the pressure within which is to be controlled, and the entire control device 1 is disposed inside of the cabin, which is indicated by the broken line 7. The casing 2 consists of a lower, somewhat larger portion 9 whose lower wall portion 10 is connected by a suitable flange device 11 with the cabin wall surrounding the opening 6, and after flaring outwardly upwardly from its lower end, is connected with a generally radially extending wall portion 12 which provides a seat 13 for an annular valve seat element 14 of fiber or any other suitable material. The valve 3 cooperates with the valve seat 14 and is connected by means of a bolt 15 extending through a spacing sleeve 16 with the bottom wall 17 of the bellows device 4. The upper end of the bellows device 4 is suitably connected in hermetically sealed relation at 18 to an annular member 19, which is in turn secured to a head member 20, which is held in spaced relation to the portion 9 of the casing by a smaller, generally cylindrical portion 22 of the casing 2. The head member 20 is provided with a number of radially extending passages 25 each opening at its outer end into communication with the interior of the bellows 4, and each opening at its inner end into an annular groove 26 which constitutes an enlargement of a cylindrical bore 27 formed in the head member 20. Fitting within the bore 27 and pressed into the latter is a valve guiding plug element 28 to which there is secured an upwardly projecting, internally threaded sleeve portion 29. The plug element 28 is bored at 30 to provide a close sliding fit for a pilot valve element 31 whose tapered lower end 32 is adapted to project into a chamber 33 formed in the plug 28 and communicating through openings 34 with an outer annular groove 35 in the same planes with and in communication with the annular groove 26. A passage 38 opens through the lower end of the plug 28 and connects the chamber 33 with a chamber 39 in the head 20 when the valve 31 is unseated. This chamber 39 is connected by passage means 40 and a conduit 41 with an appropriate low pressure space (when the aircraft is on the ground, with the vacuum system of the aircraft; and, if desired, when the aircraft is at sufficiently high altitudes, automatically being connected, by means which need not be detailed because they are well known in connection with other aircraft instruments, with ambient pressure). The valve 31 is surrounded at its upper end by a follower element 42 threadedly engaged with the sleeve portion 29 and adapted to prevent escape of the valve through cooperation with a cross pin 43. A spring 44 acting on the cross pin tends normally to maintain the valve 31 in a position such that it does not prevent communication between the chamber 33 and the passage 38.

The means for controlling the pilot valve 31 is housed in a further extension 46 forming a portion of the casing 2 and mounted on the upper end of the portion 22 of such casing. The casing portion 46 is open at its upper end, as at 47, and supports the upper end of a screen 48 whose lower end is suitably mounted at 49 upon the base portion of another casing element 50, shortly to be further described. Cabin air is free to pass through the open end 47 longitudinally between the casings 46 and 50 and then outwardly through the screen 48 and downwardly through passages 51, into a space 52 formed within the upper part of the head member 20. The casing member 50 has its interior in communication through openings 53 with the space 52, and hence is internally under cabin pressure. Supported by the reduced upper end portion 54 of the casing member 50 is a transverse closure element 55 which serves as a mounting for a stop rod 56 which has an enlarged head portion 57 spaced a short distance from its upper end. To this head portion there is brazed or otherwise suitably secured the upper end of a bellows 58 whose lower end is connected to a head member 59 which is adapted at its lower side to engage the rounded upper end of the pilot valve element 31, and which at its upper side has a projecting portion 60, within a recess 61 in which the end of the stop rod 56 is adapted to be received. The space within the bellows 58 is evacuated.

When cabin pressure is above a predetermined value, for example, 22.22 inches of mercury absolute, the head 59 abuts the stop rod 56; that is to say, unless the cabin pressure is below a predetermined value which corresponds to any desired elevation (8,000 feet, in the example mentioned) the head 59 does not maintain the pilot valve 31 in a position closing communication between the port 38 and the chamber 33, and the valve 31 will accordingly stand open, and accordingly the interior of the bellows 4 will be connected through the passage means 25, the annular grooves 26, 35, the ports 34, the chamber 33, the port 38, the space 39 and the conduit means 40, either with the vacuum system of the aircraft or with ambient pressure, depending upon the point of connection of the conduit means 40.

Within the housing portion 54 there is slidably guided a sleeve 63 having an inwardly projecting flange portion 64 at its upper end. This flange portion serves as an abutment for the upper end of a spring 65 whose lower end engages a member 66 fixed to the head member 59 and centering the spring with respect to the head member.

The internally flanged upper end portion 64 of the sleeve 63 carries radially projecting pins 70 which engage in internal threads 71 formed on a rotatable element 72 which is fixed against longitudinal movement by an internal flange portion 73 which engages the head member 55 at one side and is engaged at its other side by the radially extending peripheral portion 75, which is fixed against rotation with respect to the head portion 55 and engages the central upper portion of the latter. The member 55 contains a series of openings 76 through which any suitable means may be extended to cooperate with openings 77 in the uppermost portion of the member 72 to maintain a desired setting, if this be wished. Suitable ribs 78 are formed on the outside of the member 72 to facilitate grasping the same for rotating it. Washer means 80 and a nut 81 secure the parts at the upper end of the stop rod 56 in fixed relation to each other. By varying the force exerted by the spring 65 the point at which the head 59 will be caused to engage the end of the pilot valve member 31 and cause the seating of the latter, may be varied. As previously indicated, the spring may be so tensioned that when cabin pressure corresponds to ambient pressure at 8,000 feet the spring will be capable of overcoming the absolute pressure exerted on the end of the bellows 58 and seat the pilot valve.

It has been pointed out that the space 52 is in communication with the interior of the cabin, and it will be noted, on reference to Fig. 2, that one of the radial passages 25 has communication with the space 52, regulated by a needle valve 85, through a valve-seat-surrounded right angle passage 86 opening through the side of one of the ribs 87 in which the passages 25 are formed.

Now returning to the lower portion 9 of the housing 2 and to the constituent structure thereof and to the details of the construction of the valve element 3, it will be noted that the lower plate 12 is connected by radial flanges 88 with a downwardly and inwardly inclined annular wall 89 carried by a cylindrical wall 90 welded, brazed, soldered or otherwise suitably secured to a plate member 91 upon whose top the housing portion 22 is secured by screws 93. The flanges 94 of a suitable bottom member 95, which forms the lower portion of the chamber 96 in which the bellows 4 is located, are also clamped by the screws between the plate member 91 and flanges 97 formed on the lower end of the housing portion 22. The member 95 has secured to it at 98 a guide 99 for the sleeve 16 associated with the valve 3, and a spring 100 normally acts between the stationary guide member 99 and a flange 101 at the bottom of the sleeve 16 to tend to maintain the valve 3 in closed position. This spring exerts only a light pressure on the valve and may readily be overcome by valve opening pressures which will later be described. The bottom element 95 has a cylindrical wall 103 with which a balancing portion 104 carried on an upstanding sleeve portion 105 of the valve member 3 cooperates. The valve member 3 is perforated at 106 to equalize the pressure between it and the bottom member 95 with the pressure in the throat 107 of the discharge portion of the valve casing. It will be observed that the diameter of the circle of valve seating upon the valve seat ring 14 is surrounded by an annular portion of the valve element 3 of substantial width outside the valve seating line when the valve is seated, this portion being identified as 110 for purposes of convenience and including a counterbalanced outer annular portion 111 corresponding in radial dimension to the radial dimension of the balancing portion 104 previously described, and a slightly more central annular portion 112 corresponding in radial dimension to the distance between the valve seating line and the outer surface of the cylindrical portion 103 of the lower closure element 95 of the bellows compartment. The pressure on the outer (herein shown as lower) side of the portion 112 is essentially cabin pressure, while the pressure on the opposite side of this portion is essentially ambient pressure. There is, thus, an annular band, as it were, of valve element subjected on its opposite sides to differences in pressure, the pressure on the lower side, tending to open the valve 3, being cabin pressure, while the pressure on the opposite side is ambient pressure. To recapitulate, the central portions of the valve except for the cross sectional area of the circle corresponding to the outer diameter of the sleeve 16, are balanced with each other, both being subject to ambient pressure. The outermost portion of the valve member has equal, oppositely facing surfaces subjected to ambient pressure and equal, oppositely facing surfaces subjected to cabin pressure; but intermediate this outer annulus and the central portion there is an annular portion subjected on its lower side substantially to cabin pressure and on its upper side substantially to ambient pressure. This annular area, which we may assume for purposes of illustration possesses an effective valve-moving area of four square inches, will automatically prevent cabin pressure exceeding ambient pressure by more than 7.5 inches of mercury.

The mode of operation of the illustrative embodiment of the invention as so far described may now be explained. When the aircraft is standing on the ground, with the conduit 40 connected to the vacuum system of the aircraft, it will be evident that the pressure in the bellows 4 will be maintained below atmospheric pressure, for the pilot valve 31 will then stand open, since the bellows 58 will be collapsed, and since the rate of venting will exceed the permitted rate of inflow of cabin air into the interior of the bellows. Nothing will occur to change these conditions until the aircraft reaches such a height that the reduced cabin pressure (which will fall off directly as external pressure drops) is insufficient to maintain the bellows 58 collapsed against the action of the spring 65 which tends to expand the bellows. When the bellows 58 expands, it will force the head 59 against the end of the pilot valve 31 and close the latter. As soon as the pilot valve 31 is closed, the pressure inside the bellows 4 will build up, as cabin pressure will continue to flow into it through the right angled port 86.

It will be observed that the effective diameter of the bellows 4, which diameter is at least substantially equal to the diameter of the circle of contact of the valve 3, when closed, with the seat 14, is so great that it is capable of exercising quite a powerful opening force on the valve 3 when the pressure inside the bellows is sufficiently reduced compared with cabin pressure. Let it be assumed that it will require an actual lifting force of 30 pounds to raise the valve off of its seat. This force can obviously be supplied entirely by the creation of a sufficient pressure differential between the inside and the outside of the bellows 4. It can be produced in part by the production of a lesser differential in pressure and the existence of a differential in pressure on the opposite sides of the annular portion 112 of the valve 3, or it can be produced entirely by the existence of a sufficient differential in pressure on the opposite sides of the annular portion 112 of the valve. Now the ambient pressure at 8000 feet is 22.22 inches of mercury abs. and that at 35,000 feet is 7.06 inches abs., or there is a difference of 15.16 inches of mercury abs. This is very close to 7.5 pounds, and with the annular zone 112 provided by design with an effective area of four square inches, it would be possible for the differential between the pressures on the opposite sides of this area to unseat the valve 3 if cabin pressure were maintained at 22.22 inches of mercury abs. while ambient pressure at a flight altitude of 35,000 feet would be only 7.06 inches. At a flight altitude of 25,000 feet the pressure in inches of mercury abs. would be 11.09, and with the cabin pressure maintained at 22.22 the total lift provided by the subjection of the annulus 112 on its lower side to cabin pressure and on its upper side to ambient pressure would be about 22 pounds, which would leave 8 pounds to be furnished by the bellows 4 to effect opening of the valve. At 8,000 feet the cabin pressure and the ambient pressure would both be 22.22 inches of mercury abs., and there would be no lifting effect provided by the annulus 112, and to open the valve 3 all of the raising force would have to be provided by the excess of cabin pressure over the pressure inside of the bellows 4, but this would not require a large amount of pressure differential because of the relatively great cross sectional area of the bellows 4. The spring 100 will be designed so that cumulatively with the inherent resilience of the bellows 4 and the weight of the parts, it will require, for this illustrative example, 30 pounds to lift the valve 3 initially from its seat 14, and the spring should be designed so that it will not require a great increase in pressure to open the valve such an amount as may be necessary effectually to vent the quantity of air that will have to be discharged at, say, 35,000 feet in order to prevent cabin pressure from exceeding by the permissible differential, which we here assume to be 7.5 pounds per square inch, the ambient pressure at the flight altitude.

With this explanation, it will be readily understood that, since the pilot valve 31 will be standing open at ground level, and indeed until an elevation of the aircraft of 8,000 feet is attained, the valve 3 will be held wide open as the aircraft ascends from ground level to a height of 8,000 feet, for the vacuum in the vacuum system will be sufficient to provide a differential between cabin pressure, even at 8,000 feet, and the pressure inside of the bellows 4, to hold the valve 3 wide open. As the action of the valve 31 is controlled entirely by the bellows 58, and as the pressure differential between the inside and the outside of the bellows 4 is always, under the control of the valve 31, potentially more than great enough to open the valve 3, it will be evident that under the adjusted position which the valve 31 will assume under the control of the bellows 58 when cabin pressure has fallen to 22.22 inches of mercury abs., the valve 3 will be maintained in such a position as to hold cabin pressure substantially constant at the value of 22.22 inches of mercury abs. As the aircraft rises above 8,000 feet the annulus 112 will commence to exert a valve opening force, but since the position of the pilot valve 31 is controlled entirely by cabin absolute pressure, and since the pressure in the bellows tends to building up immediately upon the reduction in cabin pressure below the desired value, there will simply be a reduced amount of force required to be furnished by the bellows 4, i. e. a reduced differential in pressure between its inside and outside, as the annulus 112 commences to be effective. When the aircraft reaches the height of 35,000 feet the annulus 112 will supply all of the force necessary to control the positioning of the valve 3, and at, say, 36,000 feet the differential in pressure produced by this annulus, were there no reduction in cabin pressure, would be enough to maintain the valve 3 open a substantial distance. Actually, the cabin pressure is allowed to fall slightly when the aircraft passes above 35,000 feet, and when this occurs the pilot valve 31 goes out of operation entirely so far as the effecting of any control in the position of the valve 3 is concerned because there is no force acting on the bellows 58 capable of collapsing it sufficiently to permit reopening of the valve 31, and so at altitudes above 35,000 feet the effect of the annulus 112 is all that controls cabin pressure. This, however, is entirely adequate to maintain a differential in pressure of approximately 7.5 pounds per square inch between cabin pressure and external pressure at all altitudes above 35,000 feet, and thus to protect the aircraft and at the same time maintain as great a cabin pressure as is compatible with the design factors of the aircraft and of its supercharging system.

From the foregoing description, it will be evident that I have provided an exceedingly simple and effective arrangement involving the use of but a single pilot valve and yet effective to provide for the three highly desirable steps in cabin pressure control, namely: (a) fall with ambient pressure until a predetermined height is reached, (b) maintenance of cabin pressure substantially constant over a fairly wide range above the height first mentioned, and (c) prevention of the existence of a greater than desired differential in pressure between the cabin and ambient pressure at any time. It will be obvious that the valve 3 is always ready to perform a relief valve function should there be any derangement of such a nature that the bellows 4 would fail to effect the intended opening of the valve 3.

While I have in this application specifically described one embodiment which my invention may assume in practice, it will be understood that this form is shown for purposes of illustration only and that the invention may be modified and embodied in various other forms without departing from its spirit or the scope of the appended claims.

What I claim as new and desire to secure by Letters Patent is:

1. Mechanism for controlling the pressure within an aircraft cabin, comprising an outlet valve, a servo-motor for controlling the position of said valve, and absolute pressure sensitive means for controlling said servo-motor, said outlet valve having equal oppositely facing surfaces so disposed that the existence of a substantial differential between the pressures acting on said surfaces would, depending upon the side at which the higher pressure existed, tend to open or to close said valve, means for maintaining an equalization between the pressures on such surfaces, said outlet valve also having other oppositely facing surfaces so disposed that a fluid pressure acting on one of the same tends to close said outlet valve and a fluid pressure acting on the other one thereof tends to open said valve, and means for subjecting said last mentioned oppositely facing surfaces respectively in all positions of said valve substantially to external pressure and to cabin pressure for controlling said valve to preclude the existence of a differential in pressure between cabin and external pressure exceeding a predetermined amount.

2. Mechanism for controlling the pressure within an aircraft cabin, comprising an outlet valve, a servo-motor for controlling the position of said valve, and a pilot valve for controlling said servo-motor, said outlet valve having equal oppositely facing surfaces so disposed that the existence of a substantial differential between the pressures acting on said surfaces would, depending upon the side at which the higher pressure existed, tend to open or to close said valve, means for maintaining an equalization between the pressures on such surfaces, said outlet valve also having other oppositely facing surfaces so disposed that a fluid pressure acting on one of the same tends to close said outlet valve and a fluid pressure acting on the other one thereof tends to open said valve, and means for subjecting said last mentioned oppositely facing surfaces respectively in all positions of said valve substantially to external pressure and to cabin pressure for controlling said valve to preclude the existence of a differential in pressure between cabin and external pressure exceeding a predetermined amount.

3. Mechanism for controlling the pressure within an aircraft cabin, comprising an outlet valve and a servo-motor for controlling the position of said valve to maintain a constant cabin pressure throughout a predetermined range of flight, said servo-motor having means responsive to cabin pressure and a lower pressure for controlling the operation thereof, said outlet valve having equal oppositely facing surfaces so disposed that the existence of a substantial differential between the pressures acting on said surfaces would, depending upon the side at which the higher pressure existed, tend to open or to close said valve, means for maintaining an equalization between the pressures on such surfaces, said valve also having other oppositely facing surfaces so disposed that a fluid pressure acting on one of the same tends to close said outlet valve and a fluid pressure acting on the other one thereof tends to open said valve, and means for subjecting said oppositely facing surfaces respectively in all positions of said valve substantially to external and cabin pressures to preclude the existence of a differential in pressure between cabin and external pressures exceeding a predetermined amount.

4. Mechanism for controlling the pressure within an aircraft cabin, comprising an outlet port surrounded by a seat, means contactable with said seat for interrupting discharge of air from a cabin and moving away from said seat variably to permit discharge of air from the cabin, and a plurality of means for controlling the relation of said means contactable with said seat to said seat, one a pilot valve controlled servo-motor device for variably regulating the relation of said means contactable with said seat to said seat to maintain a substantially constant cabin pressure over a wide range of flight altitudes and a second an overriding control consisting of means fixed with respect to said seat contacting means and having opposite areas directly subjected in respectively valve opening and valve closing directions to cabin and external pressures for effecting movement of said seat contacting means away from said seat when cabin pressure exceeds external pressure by a predetermined amount.

5. Mechanism for controlling the pressure within an aircraft cabin, comprising an outlet port surrounded by a seat, means contactable with said seat for interrupting discharge of air from a cabin and moving away from said seat variably to permit discharge of air from the cabin, said means having, when in engagement with said seat, at its side away from said outlet port, an area substantially equal to its area in communication with said port also subjected to the pressure in said outlet port, and a plurality of means for controlling the relation of said means contactable with said seat to said seat, one cabin absolute pressure controlled and one differential pressure controlled, one of said plurality of means including a bellows subjected exteriorly to cabin pressure and variably collapsible to control the position of said first mentioned means with respect to said seat and another of said plurality of means constituting an overriding control for the first and consisting of means fixed with respect to said first mentioned means and having oppositely directed pressure areas subjected respectively in opening and closing force producing directions to cabin and external pressures.

6. Mechanism for controlling the pressure within an aircraft cabin, comprising an outlet port surrounded by a seat, means contactable with said seat for interrupting discharge of air from a cabin and moving away from said seat variably to permit discharge of air from the cabin, and a plurality of means for controlling the relation of said means contactable with said seat to said seat, one absolute pressure controlled and one differential pressure controlled, one of said plurality of means including a bellows variably collapsible to control the position of said first mentioned means with respect to said seat and another of said plurality of means including a means fixed with respect to said first mentioned means and having oppositely directed pressure areas each lying wholly outside the area of said outlet port and subjected respectively in opening and closing force producing directions to cabin and external pressures.

7. Mechanism for controlling the pressure within an aircraft cabin, comprising an outlet port surrounded by a seat, means contactable with said seat for interrupting discharge of air from a cabin and moving away from said seat variably to permit discharge of air from the cabin, and a plurality of means for controlling the relation of said means contactable with said seat to said seat, one absolute pressure controlled and one differential pressure controlled, one of said plurality of means including a bellows variably collapsible to control the position of said first mentioned means with respect to said seat and another of said plurality of means consisting of means fixed with respect to said first mentioned means and having oppositely directed pressure areas each lying wholly outside a circle whose area is equal to the effective cross sectional area of the bellows and which areas are subjected respectively in opening and closing force producing directions to cabin and external pressures.

8. Mechanism for controlling the pressure within an aircraft cabin comprising means forming a seat surrounding an opening leading to the exterior of a cabin, a valve disposed inwardly of said seat with respect to flow of fluid outward through said opening, said valve having associated therewith, for controlling the movements thereof, devices for biasing said valve towards a closed position with a predetermined force and a plurality of means for overcoming such force including means providing opposing surfaces subjected continuously to cabin pressure and to ambient pressure and to the former in a valve opening direction for producing a valve opening force which increases with increases in the excess of cabin pressure over ambient pressure and is operative to overcome said predetermined force when a predetermined differential between cabin and ambient pressures exists, and means providing opposing surfaces one continuously subjected to cabin pressure and one connectible with a low pressure source to produce a valve opening force, and absolute pressure responsive means for controlling the connection with a low pressure source.

9. Mechanism for controlling the pressure within an aircraft cabin comprising means forming a seat surrounding an opening leading to the exterior of a cabin, a valve disposed inwardly of said seat with respect to flow of fluid outward through said opening, said valve having associated therewith, for controlling the movements thereof, devices for biasing said valve towards a closed position with a predetermined force and a plurality of means for overcoming such force including means providing opposing surfaces subjected continuously to cabin pressure and to ambient pressure and to the former in a valve opening direction for producing a valve opening force which increases with increases in the excess of cabin pressure over ambient pressure and is operative to overcome said predetermined force when a predetermined differential between cabin and ambient pressures exists, and means providing opposing surfaces one continuously subjected to cabin pressure and one connectible with a low pressure source to produce a valve opening force, and absolute pressure responsive means for controlling the connection with a low pressure source, said several opposing surfaces being all movable with said valve and mutually distinct.

10. Mechanism for controlling the pressure within an aircraft cabin comprising means forming a seat surrounding an opening leading to the exterior of a cabin, a valve disposed inwardly of said seat with respect to flow of fluid outward through said opening, said valve having associated therewith, for controlling the movements thereof, devices for biasing said valve towards a closed position with a predetermined force and a plurality of means for overcoming such force including means providing substantially equal opposing surfaces subjected continuously to cabin pressure and to ambient pressure and to the former in a valve opening direction for producing a valve opening force which increases with increases in the excess of cabin pressure over ambient pressure and is operative to overcome said predetermined force when a predetermined differential between cabin and ambient pressures exists, and means providing opposing surfaces one continuously subjected to cabin pressure and one connectible with a low pressure source to produce a valve opening force, and absolute pressure responsive means for controlling the connection with a low pressure source, said several opposing surfaces being all movable with said valve and one of said sets of surfaces lying radially inward of the zone of contact between valve and seat and the other radially outward of such zone.

11. Mechanism for controlling the pressure within an aircraft cabin, comprising an outlet valve, a seat for said valve, said valve having an annular portion adapted to contact said seat and an annular portion lying outside said first mentioned annular portion, means for subjecting said second annular portion on its side towards said seat to cabin pressure and means for subjecting said second annular portion on its opposite side to external pressure, whereby said valve is biased by the differential between said pressures, when cabin pressure exceeds external pressure, in an opening direction, and supplemental controlling means for said valve including a servo-motor and a pilot valve controlling said servo-motor.

12. Mechanism for controlling the pressure within an aircraft cabin, comprising an outlet valve, a seat for said valve, said valve having an annular portion adapted to contact said seat and an annular portion lying outside said first mentioned annular portion, means for subjecting said second annular portion on its side towards said seat to cabin pressure and means for subjecting said second annular portion on its opposite side to external pressure, whereby said valve is biased by the differential between said pressures, when cabin pressure exceeds external pressure, in an opening direction, and supplemental controlling means for said valve including a servo-motor, a pilot valve for controlling said servo-motor, and absolute pressure responsive controlling means for said pilot valve.

13. Mechanism for controlling the pressure within an aircraft cabin, comprising an outlet valve having a seat, said outlet valve comprising a seat engaging portion, a portion lying radially to the inside of said seat engaging portion and a portion lying radially outside of said seat engaging portion, said last mentioned portion made up of two portions, means for so subjecting one of said two portions on opposite surfaces to pressure that substantially no unbalanced force biasing the valve in either direction is exerted thereby, means for so subjecting the other of said two portions on opposed surfaces to cabin pressure and to external pressure that when cabin pressure exceeds external pressure the valve is pressed in an opening direction, and means associated with said valve for maintaining it open until a predetermined altitude is attained by the aircraft and thereafter over a wide range in altitude of flight controlling said valve to maintain cabin pressure constant, whereafter said valve portion subjected on opposed surfaces to cabin and external pressures, through the said pressures acting on the opposite sides thereof, prevents the building up of a differential between cabin and external pressures in excess of a predetermined amount.

14. Mechanism for controlling the pressure within an aircraft cabin, comprising an outlet valve having a seat, said outlet valve comprising a seat engaging portion, a portion lying radially to the inside of said seat engaging portion and a portion lying radially outside of said seat engaging portion, said last mentioned portion made up of two portions, means for subjecting said second mentioned portion to like pressures on the opposed surfaces thereof, means for so subjecting one of said two portions of said last mentioned portion on opposite surfaces to pressure that substantially no unbalanced force biasing the valve in either direction is exerted thereby, means for so subjecting the other of said two portions on opposed surfaces to cabin pressure and to external pressure that when cabin pressure exceeds external pressure the valve is pressed in an opening direction, and means associated with said valve for maintaining it open until a predetermined altitude is attained by the aircraft and thereafter over a wide range in altitude of flight controlling said valve to maintain cabin pressure constant, whereafter said valve portion subjected on opposed surfaces to cabin and external pressures, through the said pressures acting on the opposite sides thereof, prevents the building up of a differential between cabin and external pressures in excess of a predetermined amount.

15. Mechanism for controlling the pressure within an aircraft cabin, comprising an outlet port, a valve seat surrounding said port, an outlet valve having a portion thereof engageable with said seat and having portions lying radially to the inside and to the outside of the portion thereof which engages said seat, means including an opening in the portion of said valve lying to the inside of its seat engaging portion for subjecting portions of said valve at both sides of its seat engaging portion, upon surfaces away from said seat, to external pressure, means for subjecting the portion of said valve lying to the outside of its seat engaging portion, upon its surface toward said seat, to cabin pressure, a servo-motor for controlling the position of said valve, and absolute pressure sensitive means for controlling said servo-motor.

16. Mechanism for controlling the pressure within an aircraft cabin, comprising an outlet port, a valve seat surrounding said port, an outlet valve having a portion thereof engageable with said seat and having portions lying radially to the inside and to the outside of its seat engaging portion, a servo-motor arranged for controlling the position of said valve, absolute pressure sensitive means for controlling said servo-motor, a housing for said servo-motor, said outlet valve having a portion thereof lying outside its seat engaging portion slidably engaging said housing and sealing the space between said housing and said outlet valve against communication with the cabin interior, means for subjecting the space between said housing and said valve to external pressure, and means for subjecting said valve on the portion thereof lying outside its seat engaging portion and on surfaces opposite the space between said valve and said housing to cabin pressure.

17. Mechanism for controlling the pressure within an aircraft cabin comprising an outlet valve and means for controlling said outlet valve (a) to permit cabin pressure to fall off to a predetermined absolute value, (b) then to maintain cabin pressure, above a predetermined altitude of flight at which ambient pressure corresponds to said predetermined value, substantially constant until the differential between cabin pressure and external pressure reaches a predetermined value, and (c) thereupon to limit the differential between cabin and external pressures, including for the effecting of functions (a) and (b) a servo-motor for controlling the position of said outlet valve having associated therewith a control valve movable to control the positioning, under the control of said servo-motor, of said outlet valve and an evacuated, collapsible chamber member exposed to cabin pressure and operatively connected to said control valve to govern the position thereof, and for effecting function (c) a portion of said outlet valve itself having opposed pressure areas and means for subjecting said opposed pressure areas continuously, whether said outlet valve be open or closed, one to cabin pressure acting in a direction to open said valve and the other to ambient pressure acting in a direction to close said valve.

WIN W. PAGET.

REFERENCES CITED

The following references are of record in the file of this patent:

UNITED STATES PATENTS

| Number | Name | Date |
| --- | --- | --- |
| 1,562,663 | Strong | Nov. 24, 1925 |
| 2,002,057 | Gregg | May 21, 1935 |
| 2,307,199 | Cooper | Jan. 5, 1943 |
| 2,342,220 | Price | Feb. 22, 1944 |
| 2,366,146 | Martin-Hurst | Dec. 26, 1944 |
| 2,393,343 | Schroeder | Jan. 22, 1946 |
| 2,399,326 | Crot | Apr. 30, 1946 |
| 2,419,707 | Cooper et al. | Apr. 29, 1947 |
| 2,433,206 | Dube | Dec. 23, 1947 |

FOREIGN PATENTS

| Number | Country | Date |
| --- | --- | --- |
| 521,623 | Great Britain | May 27, 1940 |
| 679,386 | France | Jan. 9, 1930 |